US010432198B1

(12) United States Patent
Wang et al.

(10) Patent No.: US 10,432,198 B1
(45) Date of Patent: Oct. 1, 2019

(54) LIGHTWEIGHT BISTABLE PUF CIRCUIT

(71) Applicant: Ningbo University, Zhejiang (CN)

(72) Inventors: Pengjun Wang, Zhejiang (CN); Gang Li, Zhejiang (CN); Huihong Zhang, Zhejiang (CN); Yuejun Zhang, Zhejiang (CN)

(73) Assignee: Ningbo University, Zhejiang (CN)

( * ) Notice: Subject to any disclaimer, the term of this patent is extended or adjusted under 35 U.S.C. 154(b) by 0 days.

(21) Appl. No.: 16/416,293

(22) Filed: May 20, 2019

(30) Foreign Application Priority Data

Oct. 17, 2018 (CN) .......................... 2018 1 1207852

(51) Int. Cl.
*H03K 19/003* (2006.01)
*G06F 1/10* (2006.01)
*G06F 21/75* (2013.01)

(52) U.S. Cl.
CPC ......... *H03K 19/00315* (2013.01); *G06F 1/10* (2013.01); *G06F 21/75* (2013.01)

(58) Field of Classification Search
None
See application file for complete search history.

(56) References Cited

U.S. PATENT DOCUMENTS

| | | | | |
|---|---|---|---|---|
| 6,211,713 B1* | 4/2001 | Uhlmann | ............... | H03K 3/012 327/201 |
| 8,861,720 B2* | 10/2014 | Fujino | ..................... | G11C 7/24 380/29 |
| 9,640,247 B2* | 5/2017 | Chen | ..................... | G11C 11/417 |
| 9,768,781 B2* | 9/2017 | Xiao | ..................... | H03K 19/094 |
| 9,870,811 B2* | 1/2018 | Wang | .................. | G11C 11/1675 |
| 9,892,783 B2* | 2/2018 | Yoshimoto | ............ | G06F 3/0604 |
| 2003/0231538 A1* | 12/2003 | Rimondi | .................. | G11C 7/20 365/202 |

OTHER PUBLICATIONS

D. E. Holcomb et al., "Power-up SRAM state as an identifying fingerprint and source of true random numbers," IEEE Transactions on Computers, vol. 58, Issue 9, Sep. 2009, pp. 1198-1210.

(Continued)

*Primary Examiner* — Crystal L Hammond
(74) *Attorney, Agent, or Firm* — JCIPRNET (57) ABSTRACT

Disclosed is a lightweight bistable PUF circuit, comprising a decoding circuit, a timing control circuit, a PUF cell array and n sharing foot circuits. The PUF cell array is formed by m*n PUF cells arrayed in m lines and n columns. Each PUF cell includes a first PMOS transistor, a second PMOS transistor, a third PMOS transistor and a fourth PMOS transistor, and the four PMOS transistors have the minimum width-to-length ratio of 120 nm/60 nm under a TSMC 65 nm process. Each sharing foot circuit includes a first NMOS transistor, a second NMOS transistor, a third NMOS transistor, a fourth NMOS transistor, a first two-input NAND gate and a second two-input NAND gate, and the four NMOS transistors have a width-to-length ratio ranging from 2 um/60 nm to 8 um/60 nm. The lightweight bistable PUF circuit has a reset function and the advantages of small area, low power consumption, small time delay and high speed.

3 Claims, 6 Drawing Sheets

(56) References Cited

OTHER PUBLICATIONS

Y. Su et al., "A digital 1.6 pJ/bit chip identification circuit using process variations," IEEE Journal of Solid-State Circuits, vol. 43, Issue 1, Jan. 2008, pp. 69-77.

J. Li et al., "Ultra-compact and robust physically unclonable function based on voltage compensated proportional to absolute-temperature voltage generators," IEEE Journal of Solid-State Circuits, vol. 51, Issue 9, Sep. 2016, pp. 2192-2201.

S. Tao et al., "Ultra-energy-efficient temperature-stable physical unclonable function in 65 nm CMOS," Electronics Letters, vol. 52, Issue 10, May 12, 2016, pp. 805-806.

L. Jongmin et al., "A 445F2 leakage-based physically unclonable function with lossless stabilization through remapping for IoT security," 2018 IEEE International Solid-State Circuits Conference, Feb. 13, 2018, pp. 132-134.

* cited by examiner

FIG. 9

LIGHTWEIGHT BISTABLE PUF CIRCUIT

CROSS-REFERENCE TO RELATED APPLICATION

This application claims the priority benefit of China application serial no. 201811207852.2, filed on Oct. 17, 2018. The entirety of the above-mentioned patent application is hereby incorporated by reference herein and made a part of this specification.

TECHNICAL FIELD

The invention relates to a PUF circuit, in particular to a lightweight bistable PUF circuit.

DESCRIPTION OF RELATED ART

Physical unclonable functions (PUF) can physically guarantee the information security of chips and thus are drawing more and more attentions. PUF circuits are extremely promising embedded key generation circuits which are able to generate a series of random, unique and unclonable output keys by capturing random process deviations of PUF cells, and these output keys can be applied to the information security field for key generation, equipment certification, IP protection and the like.

Nowadays, there are generally two types of PUF circuits, weak PUF circuits and strong PUF circuits. In weak PUF circuits, each PUF cell usually generates a bit of output response, and the output responses of all PUF cells are regarded as independent. In strong PUF circuits, the output responses of all PUF cells are correlated to a certain extent due to the reconfiguration of the PUF cells. For this reason, the weak PUF circuits have a better anti-attack ability over the strong PUF circuits.

Figure 1A:
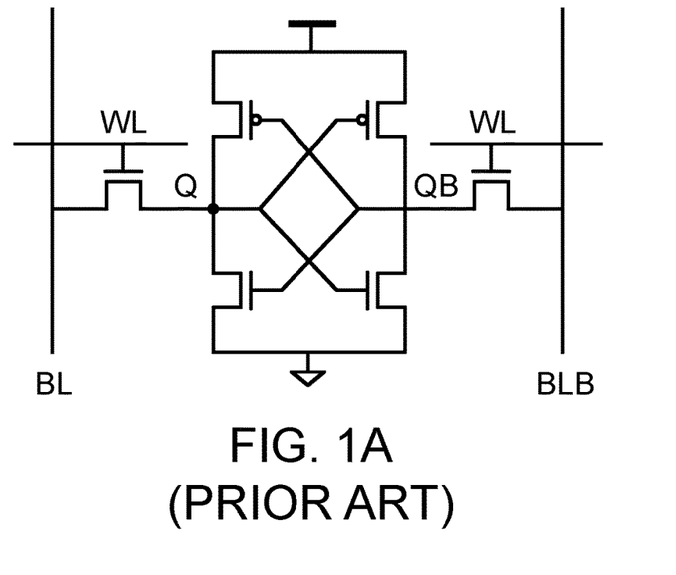
FIG. 1A is a circuit diagram of an existing SRAM-PUF cell.
Figure 1B:
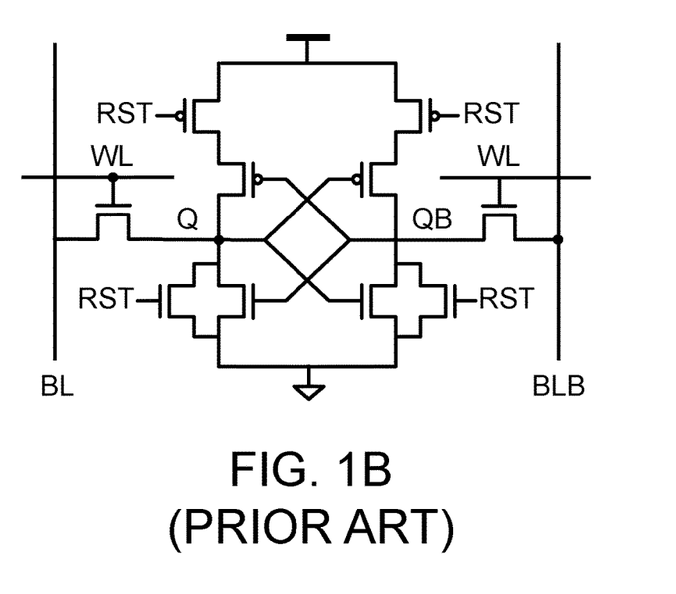
FIG. 1B is a circuit diagram of an existing SRAM-PUF cell with a reset function.

Among all existing weak PUF circuit design schemes, SRAM-PUF disclosed in Document 1 (D. E. Holcomb, et al.: "Power-up SRAM state as an identifying fingerprint and source of true random numbers," IEEE Transactions on Computers 58 (2009) 1198 (DOI: 10.1109/TC.2008.212).) is the most typical weak PUF circuit which takes the power-on initial values of SRAM-PUF cells as output keys, and the performance of the SRAM-PUF cells directly determines the performance of the weak PUF circuit. The circuit structure of the SRAM-PUF cell disclosed in Document 1 is shown in FIG. 1A. Document 2 (Y. Su, et al.: "A digital 1.6 pJ/bit chip identification circuit using process variations," IEEE Journal of Solid-State Circuits 43 (2008) 69 (DOI: 10.1109/JSSC.2007.910961).) discloses a SRAM-PUF cell with a reset function. The circuit structure of the SRAM-PUF cell with the reset function is shown in FIG. 1B. A pair of cross-coupled inverters used for capturing process deviations serves as the core structure of these two types of SRAM-PUF cells. As for the SRAM-PUF cell in Document 1, after SRAM is powered off, node Q/QB discharges to enter state '0/0'; when SRAM is powered on, node Q/QB rapidly selectively transitions from state '0/0' to stable state '0/1' or '1/0' in terms of the random process deviations of the cross-coupled inverters. As for the SRAM-PUF cell with the reset function in Document 2, when RST is at a low level, node Q/QB is pulled to state '0/0'; when RST is switched from the low level to a high level, node Q/QB rapidly and selectively transitions from state '0/0' to stable state '0/1' or '1/0' in terms of the random process deviations of the cross-coupled inverters.

A typical weak PUF circuit implemented with the SRAM-PUF cell disclosed in Document 1 or the SRAM-PUF cell with the reset function in Document 2 has output responses with good randomness, uniqueness and attack resistance. However, the weak PUF circuit implemented with the SRAM-PUF cell in Document 1 has the following drawbacks: first, keys generated after the SRAM-PUF cell is powered on cannot be reset; second, the SRAM-PUF cell includes six MOS transistors (two PMOS transistors and four NMOS transistors), and thus, too many MOS transistors are adopted; in order to ensure normal reading and writing of the SRAM-PUF cell, the six MOS transistors should be logically in proportion, and consequentially, the minimum process dimension is unavailable for the MOS transistors; and because the six MOS transistors include both PMOS transistors and NMOS transistors, the weak PUF circuit implemented with the SRAM-PUF cell has a large circuit area and high power consumption. Although the weak PUF circuit implemented with the SRAM-PUF cell with the reset function in Document 2 has a reset function, such PUF circuit still has the following drawbacks: first, the SRAM-PUF cell with the reset function includes ten MOS transistors (four PMOS transistors and six NMOS transistors), and thus, too many MOS transistors are adopted; moreover, the ten MOS transistors include both PMOS transistors and NMOS transistors, and consequentially, the weak PUF circuit implemented with the SRAM-PUF cell with the reset function has a large circuit area and high power consumption; second, due to the stack effect of the PMOS transistors, it takes a long time for node 'Q/QB' to transition from a transient state to a bistable state, which will generate a negative influence on the speed.

BRIEF SUMMARY OF THE INVENTION

The technical issue to be settled by the invention is to provide a lightweight bistable PUF circuit which has a reset function, a small circuit area, low power consumption, a small time delay and a high speed.

The following technical solution is adopted by the invention to settle the above technical issue: a lightweight bistable physical unclonable functions circuit comprises a decoding circuit, a timing control circuit, a PUF cell array and n sharing foot circuits identical in structure. The PUF cell array is formed by m*n PUF cells which are identical in structure and arrayed in m lines and n columns, wherein * is a multiplication operator. The decoding circuit has w input terminals, m output terminals, a controlled clock signal input terminal and a word line control signal input terminal. The timing control circuit has an enable signal input terminal, a clock signal input terminal, a pre-discharge signal output terminal, a controlled clock signal output terminal and a word line control signal output terminal. Each sharing foot circuit has a pre-discharge signal input terminal, an output terminal, a first bit line connecting terminal and a second bit line connecting terminal. Each PUF cell has a word line connecting terminal, a first bit line connecting terminal and a second bit line connecting terminal. Wherein, w is an integer which is equal to or greater than 1 and smaller than or equal to 9, m=2w, and n is an integer which is equal to or greater than 1. The pre-discharge signal output terminal of the timing control circuit is connected to the pre-discharge signal input terminals of the n sharing foot circuits. The controlled clock signal output terminal of the timing control circuit is connected to the controlled clock signal input terminal of the decoding circuit. The word line control signal output terminal of the timing control circuit is connected to the word line control signal input terminal of the decoding circuit. The $j^{th}$ output terminal of the decoding circuit is connected to word line terminals of the PUF cells in the $j^{th}$ line of the PUF cell array, wherein j=1, 2, . . . , m. The first bit line connecting terminal of the $k^{th}$ sharing foot circuit is connected to the first bit line connecting terminals of the PUF cells in the $k^{th}$ column of the PUF cell array. The second bit line connecting terminal of the $k^{th}$ sharing foot circuit is connected to the second bit line connecting terminals of the PUF cells in the $k^{th}$ column of the PUF cell array, wherein k=1, 2, . . . , n. Each PUF cell includes a first PMOS transistor, a second PMOS transistor, a third PMOS transistor and a fourth PMOS transistor, wherein a source of the first PMOS transistor and a source of the second PMOS transistor are accessed to a power supply; a gate of the first PMOS transistor and a drain of the second PMOS transistor are connected to a drain of the fourth PMOS transistor; a drain of the first PMOS transistor and a gate of the second PMOS transistor are connected to a drain of the third PMOS transistor; a source of the third PMOS transistor is the first bit line connecting terminal of the PUF cell; a gate of the third PMOS transistor is connected to a gate of the fourth PMOS transistor, and a corresponding connecting terminal is the word line connecting terminal of the PUF cell; a source of the fourth PMOS transistor is the second bit line connecting terminal of the PUF cell; and the first PMOS transistor, the second PMOS transistor, the third PMOS transistor and the fourth PMOS transistor have the minimum width-to-length ratio of 120 nm/60 nm under the TSMC 65 nm process. Each sharing foot circuit includes a first NMOS transistor, a second NMOS transistor, a third NMOS transistor, a fourth NMOS transistor, a first two-input NAND gate and a second two-input NAND gate, wherein the first two-input NAND gate and the second two-input NAND gate each have a first input terminal, a second input terminal and an output terminal; a source of the first NMOS transistor, a source of the second NMOS transistor, a source of the third NMOS transistor and a source of the fourth NMOS transistor are all grounded; a gate of the first NMOS transistor, a drain of the second NMOS transistor and a drain of the fourth NMOS transistor are connected to the second input terminal of the second two-input NAND gate, and a corresponding connecting terminal is the second bit line connecting terminal of the sharing foot circuit; a drain of the first NMOS transistor, a drain of the third NMOS transistor and a gate of the second NMOS transistor are connected to the first input terminal of the first two-input NAND gate, and a corresponding connecting terminal is the first bit line connecting terminal of the sharing foot circuit; a gate of the third NMOS transistor is connected to a gate of the fourth NMOS transistor, and a corresponding connecting terminal is the pre-discharge signal input terminal of the sharing foot circuit; the second input terminal of the first two-input NAND gate is connected to the output terminal of the second two-input NAND gate; the first input terminal of the second two-input NAND gate is connected to the output terminal of the first two-input NAND gate, and a corresponding connecting terminal is the output terminal of the sharing foot circuit; and the first NMOS transistor, the second NMOS transistor, the third NMOS transistor and the fourth NMOS transistor have a width-to-length ratio ranging from 2 um/60 nm to 8 um/60 nm.

The timing control circuit comprises a latch, a first two-input AND gate, a delay chain, a second two-input AND gate and a buffer. The latch has a clock terminal, an input terminal and an output terminal. The first two-input AND gate and the second two-input AND gate each have a first input terminal, a second input terminal and an output terminal. The input terminal of the latch is the enable signal input terminal of the timing control circuit. The clock terminal of the latch is connected to the second input terminal of the first two-input AND gate, and a corresponding connecting terminal is the clock signal input terminal of the timing control circuit. The output terminal of the latch is connected to the first input terminal of the first two-input AND gate. The output terminal of the first two-input AND gate and the input terminal of the delay chain are connected to the second input terminal of the second two-input AND gate, and a corresponding connecting terminal is the controlled clock signal output terminal of the timing control circuit. The output terminal of the delay chain is connected to the first input terminal of the second two-input AND gate. The output terminal of the second two-input AND gate is connected to the input terminal of the buffer, and a corresponding connecting terminal is the word line control signal output terminal of the timing control circuit. The output terminal of the buffer is the pre-discharge signal output terminal of the timing control circuit.

The delay chain is formed by 2h+1 inverters which are sequentially connected in series, wherein h is an integer which is equal to or greater than 0. An input terminal of the first inverter is an input terminal of the delay chain, and an output terminal of the $(2h+1)^{th}$ inverter is an output terminal of the delay chain.

Compared with the prior art, the invention has the following advantages: a weak PUF circuit is formed by a decoding circuit, a timing control circuit, a PUF cell array and n sharing foot circuits identical in structure, and the PUF cell array is formed by m*n PUF cells which are identical in structure and arrayed in m lines and n columns; under the control of the decoding circuit, n PUF cells in the same line are activated to perform reading operation in every clock cycle, read values are latched by the n sharing foot circuits, the n sharing foot circuits generate n-bit output responses and reset under the control of a pre-discharge signal output by the timing control circuit, each PUF cell is formed by a first PMOS transistor, a second PMOS transistor, a third PMOS transistor and a fourth PMOS transistor having the minimum size and is of a full PMOS structure, and thus, the weak PUF circuit is simple in structure, more compact in layout and smaller in area; meanwhile, the parasitic capacitances in each line and each column of the PUF cell array including a unit number of PUF cells are small, and thus, the dynamic power consumption is low; furthermore, there is no stack effect among the four PMOS transistors in each PUF cell, and an evaluation stage is also a data reading stage, which means that evaluation and reading are integrated, so that the output response time is greatly shortened; and compared with the PUF cells designed in such a manner that evaluation and data reading are separately performed in sequence in Document 1 and Document 2, the weak PUF circuit has a high evaluation speed. Thus, the weak PUF circuit of the invention has a reset function, a small area, low power consumption, a small time delay and a high speed.

DETAILED DESCRIPTION OF THE INVENTION

The invention is further expounded below with reference to the accompanying drawings and embodiments.

Figure 2:
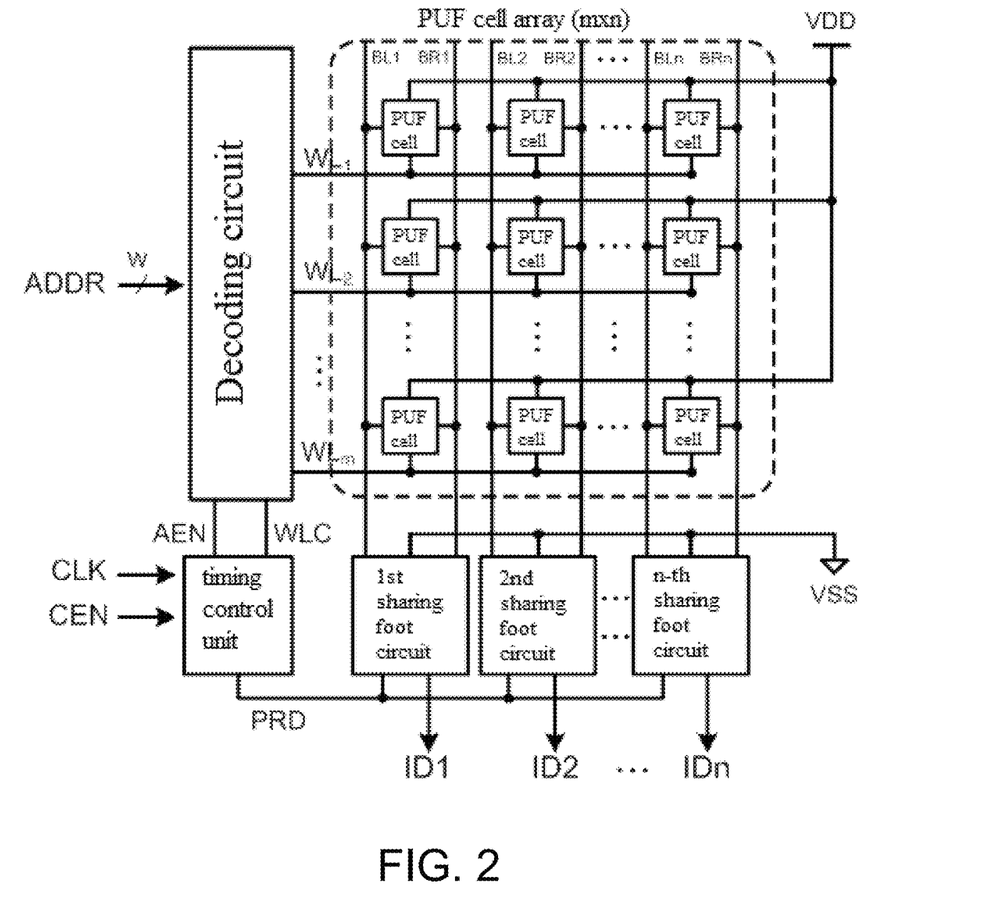
FIG. 2 is a structure and principle block diagram of a lightweight bistable PUF circuit of the invention.
Figure 3:
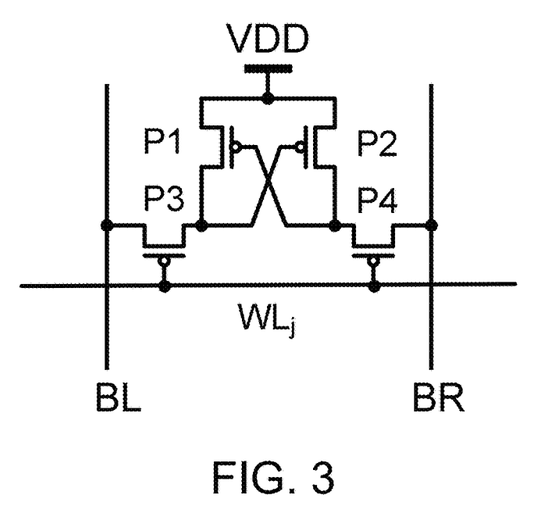
FIG. 3 is a circuit diagram of a PUF cell of the lightweight bistable PUF circuit of the invention.
Figure 4:
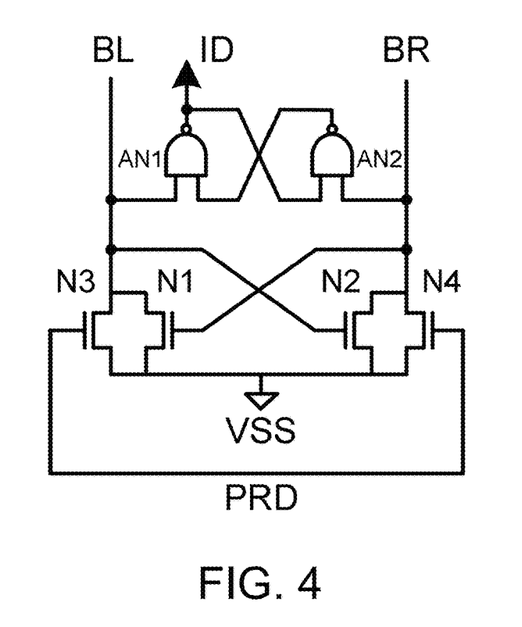
FIG. 4 is a circuit diagram of a sharing foot circuit of the lightweight bistable PUF circuit of the invention.

Embodiment 1: As shown in FIGS. 2, 3 and 4, a lightweight bistable PUF circuit comprises a decoding circuit, a timing control circuit, a PUF cell array and n sharing foot circuits identical in structure. The PUF cell array is formed by m*n PUF cells which are identical in structure and arrayed in m lines and n columns, wherein * is a multiplication operator. The decoding circuit has w input terminals, m output terminals, a controlled clock signal input terminal and a word line control signal input terminal. The timing control circuit has an enable signal input terminal, a clock signal input terminal, a pre-discharge signal output terminal, a controlled clock signal output terminal and a word line control signal output terminal. Each sharing foot circuit has a pre-discharge signal input terminal, an output terminal, a first bit line connecting terminal and a second bit line connecting terminal. Each PUF cell has a word line connecting terminal, a first bit line connecting terminal and a second bit line connecting terminal. Wherein, w is an integer which is equal to or greater than 1 and smaller than or equal to 9, m=2w, and n is an integer which is equal to or greater than 1. The pre-discharge signal output terminal of the timing control circuit is connected to the pre-discharge signal input terminals of the n sharing foot circuits. The controlled clock signal output terminal of the timing control circuit is connected to the controlled clock signal input terminal of the decoding circuit. The word line control signal output terminal of the timing control circuit is connected to the word line control signal input terminal of the decoding circuit. The $j^{th}$ output terminal of the decoding circuit is connected to word line terminals of the PUF cells in the $j^{th}$ line of the PUF cell array, wherein j=1, 2, . . . , m. The first bit line connecting terminal of the $k^{th}$ sharing foot circuit is connected to the first bit line connecting terminals of the PUF cells in the $k^{th}$ column of the PUF cell array. The second bit line connecting terminal of the $k^{th}$ sharing foot circuit is connected to the second bit line connecting terminals of the PUF cells in the $k^{th}$ column of the PUF cell array, wherein k=1, 2, . . . , n. Each PUF cell includes a first PMOS transistor P1, a second PMOS transistor P2, a third PMOS transistor P3 and a fourth PMOS transistor P4, wherein a source of the first PMOS transistor P1 and a source of the second PMOS transistor P2 are accessed to a power supply VDD; a gate of the first PMOS transistor P1 and a drain of the second PMOS transistor P2 are connected to a drain of the fourth PMOS transistor P4; a drain of the first PMOS transistor P1 and a gate of the second PMOS transistor P2 are connected to a drain of the third PMOS transistor P3; a source of the third PMOS transistor P3 is the first bit line connecting terminal of the PUF cell; a gate of the third PMOS transistor P3 is connected to a gate of the fourth PMOS transistor P4, and a corresponding connecting terminal is the word line connecting terminal of the PUF cell; a source of the fourth PMOS transistor P4 is the second bit line connecting terminal of the PUF cell; and the first PMOS transistor P1, the second PMOS transistor P2, the third PMOS transistor P3 and the fourth PMOS transistor P4 have the minimum width-to-length ratio of 120 nm/60 nm under the TSMC 65 nm process.

Each sharing foot circuit includes a first NMOS transistor N1, a second NMOS transistor N2, a third NMOS transistor N3, a fourth NMOS transistor N4, a first two-input NAND gate AN1 and a second two-input NAND gate AN2, wherein the first two-input NAND gate AN1 and the second two-input NAND gate AN2 each have a first input terminal, a second input terminal and an output terminal; a source of the first NMOS transistor N1, a source of the second NMOS transistor N2, a source of the third NMOS transistor N3 and a source of the fourth NMOS transistor N4 are all grounded; a gate of the first NMOS transistor N1, a drain of the second NMOS transistor N2 and a drain of the fourth NMOS transistor N4 are connected to the second input terminal of the second two-input NAND gate AN2, and a corresponding connecting terminal is the second bit line connecting terminal of the sharing foot circuit; a drain of the first NMOS transistor N1, a drain of the third NMOS transistor N3 and a gate of the second NMOS transistor N2 are connected to the first input terminal of the first two-input NAND gate AN1, and a corresponding connecting terminal is the first bit line connecting terminal of the sharing foot circuit; a gate of the third NMOS transistor N3 is connected to a gate of the fourth NMOS transistor N4, and a corresponding connecting terminal is the pre-discharge signal input terminal of the sharing foot circuit; the second input terminal of the first two-input NAND gate AN1 is connected to the output terminal of the second two-input NAND gate AN2; the first input terminal of the second two-input NAND gate AN2 is connected to the output terminal of the first two-input NAND gate AN1, and a corresponding connecting terminal is the output terminal of the sharing foot circuit; and the first NMOS transistor N1, the second NMOS transistor N2, the third NMOS transistor N3 and the fourth NMOS transistor N4 have a width-to-length ratio ranging from 2 um/60 nm to 8 um/60 nm.

In this embodiment, the decoding circuit and the timing control circuit are mature products in corresponding technical fields.

Figure 5:
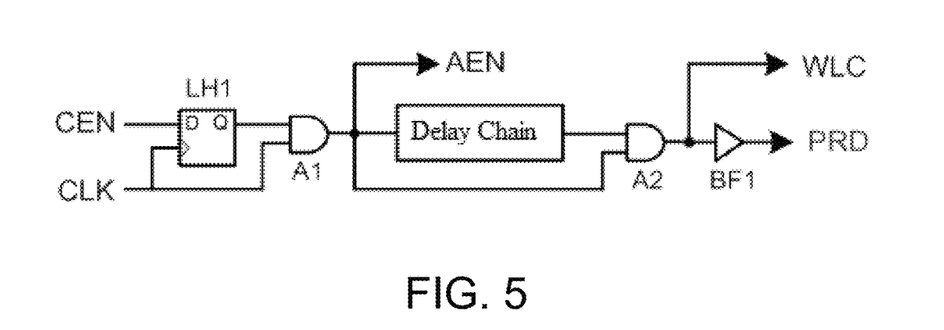
FIG. 5 is a circuit diagram of a timing control circuit of the lightweight bistable PUF circuit of the invention.

Embodiment 2: this embodiment is basically identical with embodiment 1 and is different from embodiment 1 in the following aspects:

In this embodiment, as shown in FIG. 5, the timing control circuit comprises a latch LH1, a first two-input AND gate A1, a delay chain, a second two-input AND gate A2 and a buffer BF1. The latch LH1 has a clock terminal, an input terminal and an output terminal. The first two-input AND gate A1 and the second two-input AND gate A2 each have a first input terminal, a second input terminal and an output terminal. The input terminal of the latch LH1 is the enable signal input terminal of the timing control circuit. The clock terminal of the latch LH1 is connected to the second input terminal of the first two-input AND gate A1, and a corresponding connecting terminal is the clock signal input terminal of the timing control circuit. The output terminal of the latch LH1 is connected to the first input terminal of the first two-input AND gate A1. The output terminal of the first two-input AND gate A1 and the input terminal of the delay chain are connected to the second input terminal of the second two-input AND gate A2, and a corresponding connecting terminal is the controlled clock signal output terminal of the timing control circuit. The output terminal of the delay chain is connected to the first input terminal of the second two-input AND gate A2. The output terminal of the second two-input AND gate A2 is connected to the input terminal of the buffer BF1, and a corresponding connecting terminal is the word line control signal output terminal of the timing control circuit. The output terminal of the buffer BF1 is the pre-discharge signal output terminal of the timing control circuit.

Figure 6:
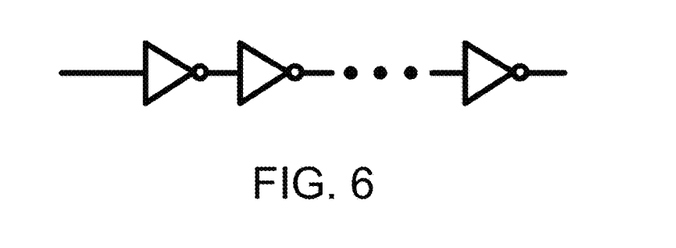
FIG. 6 is a circuit diagram of a delay chain of the lightweight bistable PUF circuit of the invention.

As shown in FIG. 6, the delay chain is formed by 2h+1 inverters which are sequentially connected in series, wherein h is an integer which is equal to or greater than 0. An input terminal of the first inverter is an input terminal of the delay chain, and an output terminal of the $(2h+1)^{th}$ inverter is an output terminal of the delay chain.

The lightweight bistable PUF circuit of the invention is implemented through the TSMC 65 nm CMOS process, wherein the PUF cell array has a size of 2048 (16 lines and 128 columns), and the NMOS transistors of each sharing foot circuit have a width-to-length ratio of 2 μm/60 nm. The whole weak PUF circuit has a circuit area of 20 μm×99 μm, and each PUF cell has an area of 1.35 μm×0.75 μm. During layout design, the PUF cells and the sharing foot circuits are configured in a central symmetry manner, and lines in adjacent metal layers are perpendicularly arrayed to reduce signal crosstalk. Layout parameters are extracted with Calibre, and Monte Carlo post-simulation is carried out on the lightweight bistable PUF circuit 100 times with Cadence/Spectre, wherein deviation analysis involves both local mismatch and global mismatch.

Figure 7A:
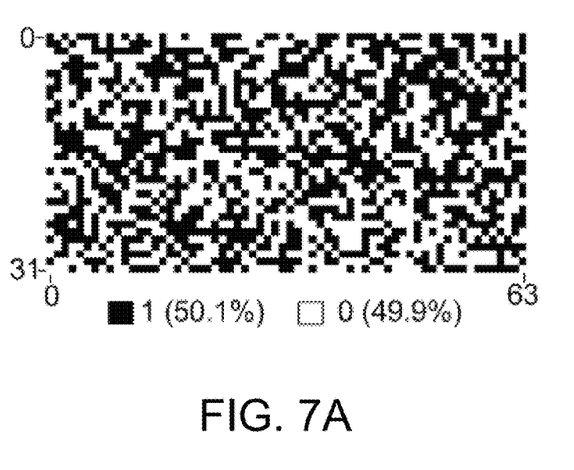
FIG. 7A is a 2D map of output responses of the lightweight bistable PUF circuit of the invention.
Figure 7B:
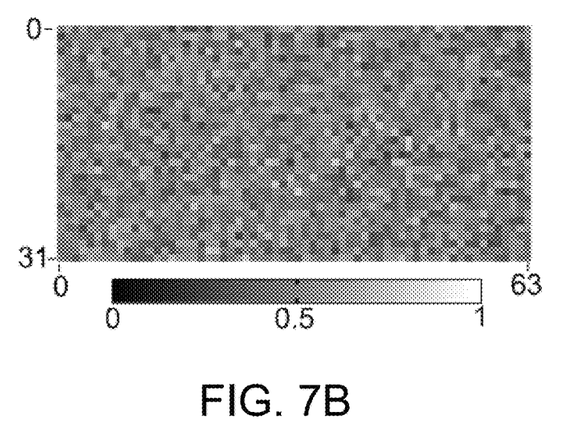
FIG. 7B is an average gray-scale map of the output responses of the lightweight bistable PUF circuit of the invention.

2D map (2-dimensional map) and gray-scale map are always used to evaluate the randomness of the output responses of weak PUF circuits. One lightweight bistable PUF circuit is randomly selected from 100 lightweight bistable PUF circuits, and the 2D map of the output responses of the selected weak PUF circuit is shown in FIG. 7A, wherein in FIG. 7A, the black pixel represents logic 1, and the white pixel represents logic 0. Statistics show that the probability to generate logic 1 (50.1%) of the weak PUF circuit and the probability to generate logic 0 (49.9%) of the weak PUF circuit are very close to the desired value 50%, and logic deviations are avoided. In addition, other weak PUF circuits have similar output results. The average gray-scale chart of the output responses of the 100 lightweight bistable PUF circuits is shown in FIG. 7B. It can be known from analysis on FIG. 7B that the average gray-scale value fluctuates near 0.5 and has no obvious spatial correlation. Thus, the lightweight bistable PUF circuit has good randomness.

Figure 8:
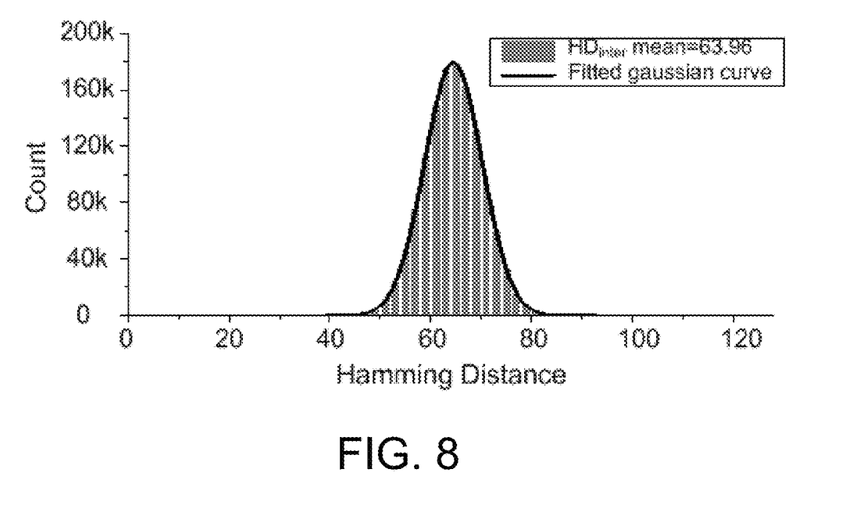
FIG. 8 is a statistical distribution chart of the inter-chip Hamming Distance of the lightweight bistable PUF circuit of the invention.

Uniqueness is one of the significant attributes of PUF circuits and is evaluated by the inter-chip Hamming Distance (HD) between different PUF circuits. As for 100 lightweight bistable PUF circuits, 1279200 (1600*1599/2) comparison groups can be generated in total (each group has a bit width of 128-bit) for calculating HD. A statistical distribution chart of the inter-chip HD of the lightweight bistable PUF circuit of the invention is shown in FIG. 8. It can be known from analysis on FIG. 8 that the lightweight bistable PUF circuit of the invention has an average inter-chip HD of 63.96 and the corresponding uniqueness of 49.97% which is very close to the desired value 50%, thus, having good uniqueness.

Figure 9:
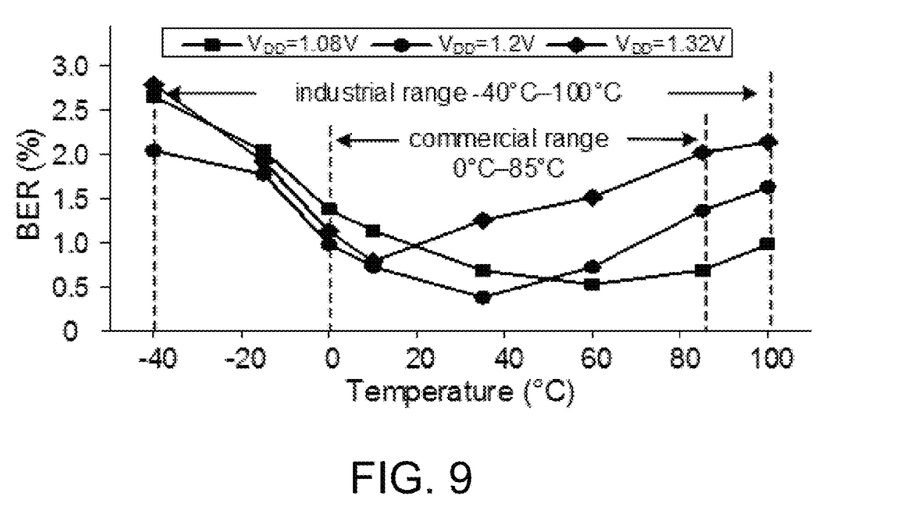
FIG. 9 is a bit-error-rate curve chart of the output responses of the lightweight bistable PUF circuit of the invention under different temperatures and voltage fluctuations.

Reliability indicates the capacity to generate identical output responses of PUF circuits in different operating environments. In this application, the reliability of the PUF circuit is evaluated by the bit-error-rate (BER) output by the PUF circuit under different temperatures and voltage fluctuations. Particularly, a reference response is acquired when 100 lightweight bistable PUF circuits operate in a normal environment (1.2V, 25° C.). Comparable responses are generated when the 100 weak PUF circuits operate in different environments. A bit-error-rate curve chart of the output responses of the lightweight bistable PUF circuit of the invention under different temperatures and voltage fluctuations is shown in FIG. 9. It can be known from analysis on FIG. 9 that under the voltage fluctuation of 10% (standard voltage 1.2V), the lightweight bistable PUF circuit has an average bit-error-rate of 1.21% and the maximum bit-error-rate of 2.02% (@1.32V, 85° C.) within the commercial temperature range (0-85° C.) and has an average bit-error-rate of 1.45% and the maximum bit-error-rate of 2.78% (@1.32V, 100° C.) within the industrial temperature range (−40-100° C.).

Power consumption and energy consumption are of great importance for resource-constrained PUF circuits. Power consumption can be obtained by multiplying the average current by the direct-current voltage. Energy consumption per bit can be calculated in terms of the following formula: $E_{bit}=P_{total}/(w*f_{clk})$, wherein w refers to the parallel output bit width of the PUF circuit, and folk refers to the clock frequency. Table 1 shows the total power consumption $P_{total}$ (@50 MHz) and the corresponding energy consumption per bit $E_{bit}$ of the lightweight bistable PUF circuit of the invention.

TABLE 1

Total power consumption ($P_{total}$) and energy consumption per bit ($E_{bit}$) of the PUF circuit under different voltages

| $V_{DD}$ (V) | 0.96 | 1.02 | 1.08 | 1.14 | 1.2 | 1.26 | 1.32 | 1.38 | 1.44 |
|---|---|---|---|---|---|---|---|---|---|
| $P_{total}$ (μw) | 83.1 | 93.5 | 108.2 | 119.2 | 134.3 | 150.2 | 166.8 | 184.2 | 203.7 |
| $E_{bit}$ (fJ/b) | 12.96 | 14.74 | 16.83 | 18.73 | 20.98 | 23.36 | 26.02 | 28.85 | 31.85 |

It can be known from analysis on Table 1 that the lightweight bistable PUF circuit of the invention has a throughput rate of 6.4 Gb/s under 1.2V/50 MHz, but the corresponding energy consumption is only 21 fJ/b.

Performance comparison of the lightweight bistable PUF circuit of the invention with PUF circuits in other relevant documents is show in Table 2.

TABLE 2

Performance comparison of the invention with the prior art

|  | Proposed | Document 3 | Document 4 | Document 2 | Document 5 |
|---|---|---|---|---|---|
| Technology (nm) | 65 | 65 | 65 | 130 | 180 |
| Cell transistor num. | 4 | 6 | 25 | 10 | 3/5 |
| PUF cell area ($F^2$) | 240 | 726.6 | — | 2991/6089 | 445/890 |
| Number of IDs | 2048 | 128 | 128 | 128 | 512 |
| Temp. range (° C.) | −40~100 | 0~80 | −40~100 | 0~80 | 0~80 |
| Voltage range (V) | 1.08~1.32 | 0.6~1.2 | 0.8-1.8 | 0.9~1.2 | 1.2~1.8 |
| Inter-PUF HD | 49.96 | 50.01 | 50.04 | 50.54/50.12 | 49.2/50 |
| BER (%) | 2.78 | 6.54 | 3.2* | 3.89/4.83 | 6.65/5.62 |
| Bit rate (Mb/s) | 6400 | 10.2 | 1 | 1 | — |
| Energy/bit (pJ/b) | 0.021 @ 1.2 V | 0.548 @ 1.2 V | 0.0103 @ 0.6 V | 0.93/1.6 @ 1 V | 9.8/3.6 @ 1.8 V |

In Table 2, * indicates that only the temperature or voltage changes. Document 3 refers to J. Li, et al.: "Ultra-compact and robust physically unclonable function based on voltage compensated proportional to absolute-temperature voltage generators," IEEE J. Solid-State Circ. 51 (2016) 2192 (DOI:_10.1109/JSSC.2016.2586498). Document 4 refers to S. Tao, et al.: "Ultra-energy-efficient temperature-stable physical unclonable function in 65 nm CMOS," Electronics Letters 52 (2016) 805 (DOI: 10.1049/e1.2016.0292). Document 5 refers to L. Jongmin, et al.: "A 445$F^2$ leakage-based physically unclonable function with lossless stabilization through remapping for IoT security," ISSCC Dig. Tech. Papers (2018) 132 (DOI: 10.1109/ISSCC.2018.8310219).

It can be known from analysis on Table 2 that the PUF circuit of the invention has advantages in circuit area, energy consumption, reliability and the like. Particularly, the PUF cell is provided with only four smallest PMOS transistors and has the corresponding minimum characteristic size of 240$F^2$, which is 46% smaller than an existing PUF cell with the minimum area (Document 5). Under the standard voltage of 1.2V, the energy consumption of the lightweight bistable PUF circuit of the invention is only 21 fJ/bit, which is reduced by 96.1% compared with Document 3; and compared with Document 4, the bit-error-rate of the lightweight bistable PUF circuit of the invention is reduced by 13.1%.

What is claimed is:

1. A lightweight bistable Physical unclonable function (PUF) circuit, comprising:
   a decoding circuit;
   a timing control circuit;
   a PUF cell array; and
   n sharing foot circuits identical in structure,
   wherein the PUF cell array is formed by m*n PUF cells which are identical in structure and arrayed in m lines and n columns, wherein * is a multiplication operator; the decoding circuit has w input terminals, m output terminals, a controlled clock signal input terminal and a word line control signal input terminal, the timing control circuit has an enable signal input terminal, a clock signal input terminal, a pre-discharge signal output terminal, a controlled clock signal output terminal and a word line control signal output terminal, each said sharing foot circuit has a pre-discharge signal input terminal, an output terminal, a first bit line connecting terminal and a second bit line connecting terminal, and each said PUF cell has a word line connecting terminal, a first bit line connecting terminal and a second bit line connecting terminal,
   wherein w is an integer which is equal to or greater than 1 and smaller than or equal to 9, $m=2^w$, and n is an integer which is equal to or greater than 1; the pre-discharge signal output terminal of the timing control circuit is connected to the pre-discharge signal input terminals of the n sharing foot circuits, the controlled clock signal output terminal of the timing control circuit is connected to the controlled clock signal input terminal of the decoding circuit, the word line control signal output terminal of the timing control circuit is connected to the word line control signal input terminal of the decoding circuit, and the $j^{th}$ output terminal of the decoding circuit is connected to word line terminals of the PUF cells in the $j^{th}$ line of the PUF cell array, wherein j=1, 2, . . . , m; the first bit line connecting terminal of the $k^{th}$ sharing foot circuit is connected to the first bit line connecting terminals of the PUF cells in the $k^{th}$ column of the PUF cell array, and the second bit line connecting terminal of the $k^{th}$ sharing foot circuit is connected to the second bit line connecting terminals of the PUF cells in the $k^{th}$ column of the PUF cell array, wherein k=1, 2, . . . , n; wherein each said PUF cell includes a first PMOS transistor, a second PMOS transistor, a third PMOS transistor and a fourth PMOS transistor,
   wherein a source of the first PMOS transistor and a source of the second PMOS transistor are accessed to a power supply; a gate of the first PMOS transistor and a drain of the second PMOS transistor are connected to a drain of the fourth PMOS transistor; a drain of the first PMOS transistor and a gate of the second PMOS transistor are connected to a drain of the third PMOS transistor; a source of the third PMOS transistor is the first bit line connecting terminal of the PUF cell; a gate of the third PMOS transistor is connected to a gate of the fourth PMOS transistor, and a corresponding connecting terminal is the word line connecting terminal of the PUF cell; a source of the fourth PMOS transistor is the second bit line connecting terminal of the PUF cell; and the first PMOS transistor, the second PMOS transistor, the third PMOS transistor and the fourth PMOS transistor have a minimum width-to-length ratio of 120 nm/60 nm under a TSMC 65 nm process;
   each said sharing foot circuit includes a first NMOS transistor, a second NMOS transistor, a third NMOS transistor, a fourth NMOS transistor, a first two-input NAND gate and a second two-input NAND gate, wherein the first two-input NAND gate and the second two-input NAND gate each have a first input terminal, a second input terminal and an output terminal; a source of the first NMOS transistor, a source of the second NMOS transistor, a source of the third NMOS transistor and a source of the fourth NMOS transistor are all grounded; a gate of the first NMOS transistor, a drain of the second NMOS transistor and a drain of the fourth NMOS transistor are connected to the second input terminal of the second two-input NAND gate, and a corresponding connecting terminal is the second bit line connecting terminal of the sharing foot circuit; a drain of the first NMOS transistor, a drain of the third NMOS transistor and a gate of the second NMOS transistor are connected to the first input terminal of the first two-input NAND gate, and a corresponding connecting terminal is the first bit line connecting terminal of the sharing foot circuit; a gate of the third NMOS transistor is connected to a gate of the fourth NMOS transistor, and a corresponding connecting terminal is the pre-discharge signal input terminal of the sharing foot circuit; the second input terminal of the first two-input NAND gate is connected to the output terminal of the second two-input NAND gate; the first input terminal of the second two-input NAND gate is connected to the output terminal of the first two-input NAND gate, and a corresponding connecting terminal is the output terminal of the sharing foot circuit; and the first NMOS transistor, the second NMOS transistor, the third NMOS transistor and the fourth NMOS transistor have a width-to-length ratio ranging from 2 um/60 nm to 8 um/60 nm.

2. The lightweight bistable PUF circuit according to claim 1, wherein the timing control circuit comprises a latch, a first two-input AND gate, a delay chain, a second two-input AND gate and a buffer; the latch has a clock terminal, an input terminal and an output terminal; the first two-input AND gate and the second two-input AND gate each have a first input terminal, a second input terminal and an output terminal; the input terminal of the latch is the enable signal input terminal of the timing control circuit; the clock terminal of the latch is connected to the second input terminal of the first two-input AND gate, and a corresponding connecting terminal is the clock signal input terminal of the timing control circuit; the output terminal of the latch is connected to the first input terminal of the first two-input AND gate; the output terminal of the first two-input AND gate and the input terminal of the delay chain are connected to the second input terminal of the second two-input AND gate, and a corresponding connecting terminal is the controlled clock signal output terminal of the timing control circuit; the output terminal of the delay chain is connected to the first input terminal of the second two-input AND gate; the output terminal of the second two-input AND gate is connected to the input terminal of the buffer, and a corresponding connecting terminal is the word line control signal output terminal of the timing control circuit; and the output terminal of the buffer is the pre-discharge signal output terminal of the timing control circuit.

3. The lightweight bistable PUF circuit according to claim 2, wherein the delay chain is formed by 2h+1 inverters which are sequentially connected in series, wherein h is an integer which is equal to or greater than 0, an input terminal of the first inverter is an input terminal of the delay chain, and an output terminal of the $(2h+1)^{th}$ inverter is an output terminal of the delay chain.

* * * * *